United States Patent [19]

Bliznak et al.

[11] 4,277,511
[45] Jul. 7, 1981

[54] SWEETENER AND FLAVORING COMPOSITIONS AND METHOD OF PRODUCING SAME

[75] Inventors: John B. Bliznak, Lombard; Rudolph E. Harcarufka, Deerfield, both of Ill.

[73] Assignee: Alberto-Culver Company, Melrose Park, Ill.

[21] Appl. No.: 932,782

[22] Filed: Aug. 11, 1978

Related U.S. Application Data

[63] Continuation-in-part of Ser. No. 789,097, Apr. 20, 1977, abandoned.

[51] Int. Cl.³ .................... A23L 1/236; A23L 1/226
[52] U.S. Cl. .................................... 426/548; 426/650; 426/658; 426/804
[58] Field of Search ............... 426/548, 658, 650, 804, 426/471, 590, 594, 597

[56] References Cited

U.S. PATENT DOCUMENTS

| 3,282,706 | 11/1966 | Muller et al. | 426/548 |
| 3,296,079 | 1/1967 | Griffin | 426/548 X |
| 3,656,973 | 4/1972 | Paterson et al. | 426/804 X |
| 3,699,132 | 10/1972 | Acton et al. | 426/548 X |
| 3,761,288 | 9/1973 | Glicksman et al. | 426/548 |
| 3,851,073 | 11/1974 | Cook | 426/548 X |

OTHER PUBLICATIONS

Arctander, Perfume and Flavor Chemicals, I, Montclair, N.J., 1025 (1969).
Cook et al., "Glycyrrhizin", *Symposium: Sweeteners*, The AVI Publishing Co., Inc., Westport, Conn., (1974), 211–215.
Food Engineering, vol. 38, No. 5, (1966), 46.

Primary Examiner—Esther M. Kepplinger
Attorney, Agent, or Firm—Wallenstein, Spangenberg, Hattis & Strampel

[57] ABSTRACT

Sweetener and flavoring compositions containing as an active or essential natural flavoring agent or flavoring intensifier, fully ammoniated salts or monoammoniated salts of glycyrrhizic acid, said compositions also containing a major proportion of a carrier such as sorbitol, or a starch hydrolysate; and said compositions also containing minor proportions of certain phosphate salts, with or without maltol and/or ethyl maltol.

1 Claim, No Drawings

SWEETENER AND FLAVORING COMPOSITIONS AND METHOD OF PRODUCING SAME

This application is a continuation-in-part of application Ser. No. 789,097, filed Apr. 20, 1977, now abandoned.

This invention relates to sweetener and flavoring compositions, most desirably of low calorie content, which contain ammoniated glycyrrhizin as an essential natural flavoring agent or intensifier, particularly together with minor proportions of one or more certain phosphate salts, and most desirably also including a substantial proportion of a sweetener such as sorbitol, or a carrier such as a hydrolyzed starch, and minor proportions of maltol and/or ethyl maltol, with or without but particularly with certain other supplemental ingredients, all as is hereafter described in detail.

It is well known to the art that ammoniated salts of glycyrrhizic acid are essentially naturally occurring flavoring agents and which are characterized by possessing a sweetness of the order of about 50 times that of cane sugar or sucrose. Glycyrrhizic acid, as is well known, can be ammoniated, to produce ammonium glycyrrhizin, by replacing one or more of the three acid hydrogen atoms with ammonium and, accordingly, ammoniated glycyrrhizin ranges from a monoammoniated product to an essentially fully or triammoniated product, and encompasses mixtures thereof.

As commonly commercially marketed, the ammoniated salts of glycyrrhizic acid are sold in several forms, one being the so-called fully ammoniated salt of glycyrrhizic acid, ammonium glycyrrhizin (commonly, and hereafter, for convenience, called "AG"); and another being that derived by further treatment of the AG coupled with repeated crystallizations to yield a colorless salt, designated as monoammonium glycyrrhizinate (commonly, and hereafter, for convenience, called "MAG"). (Mac Andrews & Forbes Co., Camden, N.J. 08104). AG, in dried form, is a tan spray-dried power readily and easily soluble in both cold and hot water. MAG, in dry form, is colorless, and it is poorly soluble in both cold water and hot water, forming a gel in hot water. The AG and MAG are derived from byproducts of the extraction of licorice from licorice root. Ammoniated glycyrrhizin is a compound on the Food and Drug Administration list of natural GRAS flavors. Both AG and MAG, in addition to possessing sweetness and being very low in caloric content, also are characterized by a licorice character. Patents which disclose said ammoniated glycyrrhizin and compositions containing the same are U.S. Pat. Nos. 3,282,706; 3,356,505; and 3,851,073. This last-mentioned patent discloses ammoniated glycyrrhizin containing small proportions of 5'-nucleotides to repress the licorice flavor of the ammoniated glycyrrhizin without impairment of its sweetness. The AG and MAG, as such or treated as described above, have been relatively widely used for a variety of purposes including use as sweeteners, sweetness potentiators, flavors and flavor intensifiers.

The AG and MAG are commercially sold under various trade designations and various degrees of sweetness as, for instance, MAFCO-MAGNASWEET 100, MAFCO-MAGNASWEET 150, MAFCO-MAGNASWEET 180, MAFCO-MAGNASWEET 280, MAFCO-MAGNASWEET 300, and MAFCO-MAGNASWEET 350 (Mac Andrews & Forbes Co., Camden, N.J. 08104). Numbers of other types of AG and MAG are listed in the literature of Mac Andrews & Forbes Co., one of the suppliers of ammoniated glycyrrhizin, which can be utilized in the practice of the present invention. MAFCO-MAGNASWEET 280, for instance, is a dry product, containing less than 8% moisture, total sugars less than 7%, starches and gums less than 1%, not more than 0.5% insolubles in cold water, and negligible insolubles in hot water, and a maximum calorie content (Bomb Calorimeter) of 5.436 per gram. MAFCO-MAGNASWEET 150 is, likewise, a dry product, containing less than 8% moisture, total sugars less than 1%, starches and gums less than 1%, negligible insolubles in hot water, gels in cold water, and a caloric content (Bomb Calorimeter) of 5.803 per gram). MAFCO monoammonium glycyrrhizin is a highly purified salt of glycyrrhizic acid and contains not less than 98% monoammonium glycyrrhizin which is in the form of an odorless, white crystalline powder, having a melting point of 223°–225° (with decomposition) soluble to the extent of 0.1% at 20° C. It is commercially available in presolubilized form as a MAG product in the form of a free-flowing liquid, having greatly enhanced water-solubility, under the trade designation MAFCO MAGNASWEET 100.

AG and MAG have heretofore been proposed for use, and have been used, as ingredients in conjunction with other ingredients for imparting sweetness and flavoring in a variety of food and non-food products. However, when used in the context of a composition for aiding in imparting sweetness, for instance, for coffee, tea and other beverages, and for cereals or fruit berries or for soft drinks or carbonated beverages, cooking, baking and related purposes, certain problems have arisen. One of such problems, and of very practical significance, is that the AG and MAG, when so used, do not immediately exhibit their flavor of sweetness to the taste buds in the mouth. The individual experiences a relatively slow or gradual taste of the flavor of sweetness when the AG or MAG, or compositions in which it is used, are taken into the mouth, and there is a definite lag period, which may be of the order of a second or two or more, before the full or essentially full sweetening impact takes hold or manifests itself or develops. Moreover, with AG or MAG compositions, there tends to be a lingering flavor or a sweet after-taste subsequent to the aforementioned full development of the sweetness flavor on the taste buds which is objectionable to many persons. This lag period characteristic of AG and MAG is objectionable to the average person and militates against the acceptability of AG and MAG in sweetener and flavoring compositions which are intended to be taken into the mouth of an individual.

In accordance with the present invention, it has been discovered that sweetener and flavoring compositions containing AG or MAG, or mixtures thereof, as well as the other ammoniated glycyrrhizins, are improved in their effectiveness and acceptability to the public generally by the inclusion in such compositions of certain inorganic phosphates. These inorganic phosphates have been discovered to speed up the time period for the manifestation of the flavor of sweetness of the AG and MAG, rendering it almost instantaneous, in other words, to reduce the aforementioned lag period, most desirously to eliminate it or at least very substantially reduce it, for the flavor of sweetness to manifest itself when contact occurs with the taste organs in the mouth. In addition, the inorganic phosphates serve to reduce the length of time that said lingering flavor of sweetness after-taste persists. All inorganic phosphates are not effective. Especially satisfactory is monosodium phosphate, anhydrous (sodium phosphate, monobasic anhydrous, NaH$_2$PO$_4$) which, in its usual commercial form, is a white granular solid, having a melting point of 60° C., and a water solubility of about 48 g/100 g solution at 25° C. Also satisfactory is monosodium acid pyrophosphate. Other useful inorganic phosphates are potassium pyrophosphate, calcium pyrophosphate, and sodium hexametaphosphate, but they are not nearly as effective as monosodium phosphate, anhydrous, and the use of which latter, therefore, represents a particularly advantageous embodiment of the present invention. Thus, in comparison with monosodium acid pyrophosphate, the monosodium phosphate, anhydrous, is especially more effective in improving the solubility of the MAG in aqueous solution, producing a clear aqueous solution whereas the monosodium acid pyrophosphate produces an aqueous solution of the MAG which tends to have a slight opacity and to leave a small quantity of undissolved particles of MAG. Moreover, sweetener compositions using monosodium phosphate, anhydrous have a slightly sweeter taste and with a reduced reduction in noticeable licorice aftertaste in comparison with the same sweetener formulation but using monosodium acid pyrophosphate in place of monosodium phosphate, anhydrous.

Illustrative of inorganic phosphates which are not effective include tricalcium phosphate, trisodium phosphate, tetrasodium pyrophosphate, tetrapotassium pyrophosphate, and sodium and other alkali metal tripolyphosphates. A simple screening test can readily be carried out with any particular inorganic phosphate by which it is easily ascertained whether it is effective to reduce said lag time.

It has also been found, in accordance with the present invention, that the incorporation into the sweetener and flavoring compositions containing AG and/or MAG and the inorganic phosphates of maltol or ethyl maltol brings about a still further improvement in the flavor of the compositions of the present invention. Maltol (3-hydroxy-2-methyl-4-pyrone) and ethyl maltol (3-hydroxy-2-ethyl-4-pyrone) are sold under the trademarks "Veltol" and "Veltol-Plus," respectively (Pfizer Inc., Chemical Division). It has been found that the maltol and the ethyl maltol serve to amplify and smooth out the sweetness and flavor of the compositions. While either maltol or ethyl maltol or mixtures thereof can be employed, it is preferred to employ ethyl maltol.

It is known to the art that maltol and ethyl maltol function as flavor enhancers for use in a variety of foods and beverages, and, in this connection, there is shown in Peterson et al. U.S. Pat. No. 3,656,973, synthetic non-nutritive sugar sweeteners which contain of the order of about 90% or more of certain glucosides in admixture with glycyrrhizin and/or other synthetic sweeteners such as cyclamates, perillartine, flavonone glycoside derivatives, saccharin and/or mixtures thereof, and which may also contain maltol or ethyl maltol. It is also known to the art, as shown in U.S. Pat. No. 3,296,079, that, generally, maltol enhances the odors and flavors of many products, including the enhancement of the apparent sweetness of natural sugars, but that, in marked contrast to its effect on natural sugars, maltol does not exhibit a sweetness-enhancing effect with non-nutritive sweetening agents, and that its effect is to mask the bitter and metallic aftertastes of such non-nutritive sweeteneing agents as cyclohexylsulfamic acid, saccharin, xylitol, arabitol, perillartine, stevioside, and physiologically-acceptable salts of those agents capable of forming salts. So far as has been ascertained, however, it has not heretofore been recognized or known that maltol or ethylmaltol would be effective to enhance the flavor of sweetener and flavoring compositions containing ammoniated glycyrrhizin, and, in this connection, it may be pointed out that, although ammoniated glycyrrhizin is commonly characterized by a licorice taste, such taste is not, and has not been characterized as, a bitter or metallic taste. Licorice taste, on the one hand, and bitter and metallic aftertastes, on the other hand, are clearly distinguishable from each other. While, therefore, pursuant to the present invention, the best embodiments of the sweetener and flavor compositions thereof utilize, in conjunction with the AG and MAG, the maltol and/or ethyl maltol, and the inorganic phosphate, in the broader aspects of the present invention reasonably effective sweetener and flavor compositions can be made without the inorganic phosphate. This, however, is a very decidedly distinctly less advantageous approach to the matter since, as noted above, the utilization of the inorganic phosphates provides highly important and significant improvements so far as the maximum improvements in or the best embodiments of the sweetener and flavor compositions of the present invention are concerned.

It is especially desirable to include in the sweetener and flavoring compositions carriers which, generally speaking, will constitute a substantial proportion and, generally, in most cases, the major ingredient of said compositions. Such carriers may be such well known sweetening agents as sugar alcohols such as sorbitol, mannitol, dulcitol, and xylitols; mono-, di- and polysaccharides such as dextrose, fructose, sucrose and maltose; and essentially non-sweetening carriers such as dextrins as derived particularly from starch hydrolysates where the starch is a cereal starch such as wheat starch and cornstarch, particularly preferred of said starch hydrolysates being those having a D.E. in the range up to about 26, gerally about 4 to about 20, and being cornstarch hydrolysates, illustrative of which are products sold under the trademark MOR-REX (CPC International, Inc.) such as MOR-REX 1918. Mixtures of two or more of such carriers can, of course, be utilized. In those instances in which low calorie sweetener and flavoring compositions are the desideratum, the carriers can readily be selected to achieve that objective. Sorbitol is particularly preferred to those of the carriers which are sweetening agents.

It is also desirable, in the best embodiments of the invention, to include certain supplemental flavoring ingredients. It has been found that, for use in the sweetener and flavor compositions of the present invention, the flavor called "ALLETONE" (4-hydroxy-2,5-dimethyl-3-(2H)-furanone) (Florasynth Laboratories, Chicago, Ill.) and the flavors called Artificial Candied Sugar Flavor and Artificial Cream Flavor (Polak Fruital Works, Middletown, N.Y.) are especially satisfactory since they provide a background of sugar flavor and accentuate the feeling of the type of sweetness associated with sucrose in said sweetener and flavoring compositions. They also enable less AG and/or MAG to be employed to obtain a given extent of flavor sweetness by replacing a part thereof with the materially less costly ALLETONE and/or Artificial Candied Sugar Flavor and/or Artificial Cream Flavor, and they also reduce whatever very minor aftertaste effects that the sweetener and flavor compositions may have.

The proportions of the ingredients are variable within reasonable limits. As a practical commercial marketing situation, the sweetener and flavoring compositions of the present invention will, as indicated above, contain one or more carriers and such carriers will constitute the major ingredient. As to the AG and/or MAG and the inorganic phosphate, and the maltol and/or ehtyl maltol and the supplemental flavoring ingredients when used, the relative proportions, in terms of weight % thereof, based on the weight of the sweetener and flavor composition, on the dry basis, will generally fall into the following: AG and/or MAG, about 1 to about 10%, preferably about 3 to about 5%; inorganic phosphate, about 3 to about 8%, preferably about 4 to about 7%; maltol and/or ethyl maltol, about 0.3 to about 1%, preferably about 0.5 to about 0.7%; and supplemental flavoring, about 2 to about 7%, preferably about 3 to about 5%.

Various other supplemental ingredients can be included in the sweetener and flavoring compositions of the present invention. Thus, in certain cases, particularly where the compositions may be stored over extended periods of time, it may be desirable to include small proportions of a preservative such as, for example, sorbic acid, potassium sorbate, sodium benzoate, sodium propionate, and methyl parahydroxy benzoate, or mixtures thereof, generally in the range of about 0.05 to 0.2% by weight of the compositions. Again, in certain instances, it may be desirable to incorporate or include in the sweetener and flavoring compositions, when marketed in a dry pulverulent form, suitable anti-caking agents, as, for instance, silicon dioxide (SYLOID, Grace Division Chemical, Baltimore, Md.) in small proportions, generally of the order of about 0.2 to about 1% by weight of the dry sweetener compositions. Other supplemental ingredients include, for example, lactose, cream of tartar, and the like.

The sweetener and flavoring compositions may be produced for commercial marketing in the form of liquids, or solids. For use in packet forms, as indicated above, in restaurants and like establishments or, for that matter, in the home, essentially homogeneous mixtures can be made by admixing dry finely divided or pulverulent materials and, with suitable diluents or carriers, and, if advisable, by physically or mechanically blending or grinding the ingredients together. For bulk use, the dry ingredients can be mixed together or ground together to form a uniform pulverulent product. However, much more desirably, the ingredients, including a suitable carrier, can be admixed to provide a liquid mixture, in the form of a solution or slurry in water, which is then dried, by drum drying, vacuum drum drying, freeze drying or spray drying, or, more specifically, the ingredients can be admixed, using a starch, particularly a cornstarch, hydrolysate in major portion, to form an aqueous solution or slurry, and dried, particularly spray dried. Such starch hydrolysates are disclosed, for instance, in U.S. Pat. Nos. 3,325,296; 3,753,739 and 3,761,288. It is preferred, as noted above, to utilize cornstarch hydrolysates having a D.E. in the range of, say 4 or 5 to about 20, and the resulting mixture can be dried in any conventional manner, especially by spray drying at conventional spray drying temperatures at about 212° F., most advantageously higher, at say, an air inlet temperature of about 450°-500° F. and an air outlet temperature of about 160°-180° F. Since AG and MAG are subject to decomposition at somewhat elevated temperatures over varying periods of times, temperature and time conditions of drying should be controlled to avoid such decomposition. By proceeding in the last-mentioned manner, a pulverulent spray dried product is obtained having expanded particles with an enhancement in the solubility in aqueous media of the AG and/or MAG and with improved flavor sweetness characteristics and at appreciable savings in cost of flavor sweetener compositions.

It will be understood that, in the broader aspects of the present invention, any of ammoniated glycyrrhizins can be utilized, singly or in admixture with others, and whether or not of the licorice flavor repressed type as shown in the aforementioned U.S. Pat. No. 3,851,073. Indeed, when the present invention is practiced in the form of its particularly preferred embodiments, it is wholly unnecessary to employ such licorice flavor repressed ammoniated glycyrrhizins since such licorice flavor as may be present in the conventional non-licorice flavor repressed ammoniated glycyrrhizins is effectively masked in said particularly preferred embodiments of the sweetener and flavoring compositions of the present invention.

The following examples are illustrative of sweetener and flavoring made in accordance with the present invention. It will be understood that many other sweetener and flavoring compositions can readily be made by utilizing different inorganic phosphates, and proportions thereof, different proportions of AG and/or MAG, with or without maltol and/or ethyl maltol and varying percentages thereof, and different carriers and the proportions thereof, in light of the guiding principles and teachings contained herein. All percentages recited are in terms of weight percent of the stated ingredients measured on the dry basis.

EXAMPLE 1

| | % |
|---|---|
| CERELOSE 2025 (DEXTROSE) | 50 |
| MOR-REX 1918 | 27.5 |
| SORBITOL | 7 |
| MAG (MAFCO-MAGNASWEET 100) | 3.75 |
| ARTIFICIAL CANDIED SUGAR FLAVOR | 2 |
| ALLETONE | 2.375 |
| SODIUM ACID PYROPHOSPHATE | 6.25 |
| ETHYL MALTOL | 0.625 |
| SYLOID 244 (SILICON DIOXIDE) | 0.5 |

The foregoing pulverulent composition is conveniently prepared by charging the ingredients in the order listed into a ribbon blender and blended for about 10 minutes. It is an excellent sweetener and flavoring composition. It is conveniently packaged in packets containing 0.8 g of said composition which has a calorie content of 3 and is equivalent in sweetness to 2 level teaspoons of sucrose. Used in coffee or tea as a sweetener, 6 fluid ounces of the coffee or tea would contain approximately 167 ppm of the MAG and about 315 ppm of sorbitol.

EXAMPLE 2

| | % |
|---|---|
| MOR-REX 1918 | 78 |
| SORBITOL | 7 |
| MAG (MAFCO-MAGNASWEET 150) | 3.75 |

-continued

|  | % |
|---|---|
| ARTIFICIAL CANDIED SUGAR FLAVOR | 2 |
| ALLETONE | 2.375 |
| SODIUM ACID PYROPHOSPHATE | 6.25 |
| ETHYL MALTOL | 0.625 |
| WATER (make an approximately 58% solution of the stated solids) | |

95 gallons of the water, previously heated to about 125° F., is placed in a 250 gallon stainless steel tank fitted with a turbine mixer. Then 40.688 pounds of the MAG are added and mixed to form a clear solution. Then, in the following order, 67.812 pounds of the sodium acid pyrophosphate, 25.769 pounds of the ALLETONE, 21.7 pounds of the ARTIFICIAL CANDIED SUGAR FLAVOR, and 6.781 pounds of the ethyl maltol are added and mixed until a clear solution is obtained. Then, 846.3 pounds of the MORE-REX 1918 is added, in amounts of about 50 pounds at a time, with continuous mixing, and mixing is continued until a smooth solution or slurry is obtained. The said solution or slurry is pumped to a surge tank and heated to about 180°–190° F. and fed into a spray drier and spray dried.

The foregoing composition is a bulk sweetener and flavoring composition having a weight of about 0.4 g per level teaspoon and having a caloric content of about 1.5 calories per level teaspoon. In a 6 fluid ounce cup of coffee or tea, and using 1 level teaspoon of said composition therein, said cup of tea or coffee contains about 84 ppm of the MAG and about 157 ppm of sorbitol.

Other illustrative examples of the sweetener and flavor compositions, according to the present invention, which produce effective results are the following:

EXAMPLE 3

|  | % |
|---|---|
| DEXTROSE (CERELOSE 2025) | 50 |
| DEXTRINS (MOR-REX 1918) | 34.375 |
| MAG (MAFCO-MAGNASWEET 100) | 4.375 |
| SODIUM ACID PYROPHOSPHATE | 6.25 |
| ETHYL MALTOL | 0.625 |
| ARTIFICIAL CANDIED SUGAR FLAVOR | 4.375 |

The foregoing pulverulent sweetener composition is satisfactory for use in packet form in restaurants and homes.

EXAMPLE 4

|  | % |
|---|---|
| SORBITOL | 45 |
| DEXTROSE | 45 |
| MAG (MAFCO-MAGNASWEET 280) | 2.5 |
| SODIUM ACID PYROPHOSPHATE | 3.5 |
| ETHYL MALTOL | 1 |
| ARTIFICIAL CANDIED SUGAR FLAVOR | 3 |

The foregoing pulverulent sweetener composition is excellently satisfactory for use in packet form in restaurants and homes:

EXAMPLE 5

|  | % |
|---|---|
| MOR-REX 1918 (D.E.10) | 84.375 |
| MAG (MAFCO-MAGNASWEET 100) | 4.375 |
| SODIUM ACID PYROPHOSPHATE | 6.25 |
| ETHYL MALTOL | 0.625 |
| ARTIFICIAL CANDIED SUGAR FLAVOR | 4.375 |

The foregoing pulverulent sweetener composition is satisfactory as a bulk product for use in the home as a general low-calorie sweetener substitute for sucrose in beverages, in the preparation of baked goods, and other food products.

EXAMPLE 6

|  | % |
|---|---|
| CORN STARCH HYDROLYSATE (D.E.10) | 43 |
| MAG (MAFCO-MAGNASWEET 100) | 2 |
| SODIUM ACID PYROPHOSPHATE | 2.7 |
| ETHYL MALTOL | 0.3 |
| ARTIFICIAL CANDIED SUGAR FLAVOR | 2 |
| WATER | 50 |

The above composition is admixed to form a solution in the water previously heated to about 125° F., then passed through a homogenizer, then through a heat exchanger to heat the solution to about 190°–195° F. and then spray dried under conventional spray drying conditions, utilizing, for instance, an inlet temperature of about 500°–550° F. and an outlet temperature of about 120°–200° F. The spray dried product, containing about 3 to 5% moisture, is characterized by improved solubility and by a materially enhanced sweetness over that which is obtained by simply making a mechanical or physical mixture or blend of the dry pulverulent ingredients in the same proportions as they are present in the spray dried product. This enhancement in sweetness may be as much as of the order of about 15 to 20% or more and, thus permits the utilization of a substantially lesser amount of the spray dried product to provide a given degree of sweetness that is obtained with a mechanical or simply physical mixture or blend of the individual dry pulverulent ingredients to form a sweetener composition otherwise corresponding to the spray dired product in the ingredients and the proportions thereof. While other drying methods of such solutions can also be utilized, in which drying is effected at elevated temperatures, at least about 212° F. and advantageously materially higher, such as vacuum drum drying, roller drying, thin film drying, and the like, especially effective results are obtained, as noted about, by spray drying.

EXAMPLE 7

|  | % |
|---|---|
| CORN STARCH HYDROLYSATE (D.E.12) | 89.5 |
| AG | 4.5 |
| SODIUM ACID PYROPHOSPHATE | 5.2 |
| MALTOL | 0.3 |
| ETHYL MALTOL | 0.5 |

EXAMPLE 8

|  | % |
|---|---|
| SORBITOL | 84.8 |
| MAG (MAFCO-MAGNASWEET 280) | 4.5 |

-continued

|  | % |
|---|---|
| SODIUM ACID PYROPHOSPHATE | 6.3 |
| ARTIFICIAL CANDIED SUGAR FLAVOR | 4.4 |

EXAMPLE 9

|  | % |
|---|---|
| CORN STARCH HYDROLYSATE (D.E.15) | 94.8 |
| AG | 4.5 |
| ETHYL MALTOL | 0.7 |

EXAMPLE 10

|  | % |
|---|---|
| CORN STARCH HYDROLYSATE (D.E.12) | 90.3 |
| MAG (MAFCO-MAGNASWEET 280) | 4.5 |
| ETHYL MALTOL | 0.7 |
| ALLETONE | 4.5 |

EXAMPLE 11

|  | % |
|---|---|
| SORBITOL | 50 |
| DEXTRINS | 35 |
| AMMONIATED GLYCYRRHIZIN | 4 |
| SODIUM ACID PYROPHOSPHATE | 6 |
| ETHYL MALTOL | 0.6 |
| ALLETONE | 4.4 |

EXAMPLE 12

|  | % |
|---|---|
| CORN STARCH HYDROLYSATE | 84.4 |
| AMMONIATED GLYCYRRHIZIN | 4.4 |
| SODIUM ACID PYROPHOSPHATE | 6.2 |
| ETHYL MALTOL | 0.6 |
| ARTIFICIAL CANDIED SUGAR FLAVOR | 4.4 |

EXAMPLE 13

|  | % |
|---|---|
| CORN STARCH HYDROLYSATE | 90 |
| AMMONIATED GLYCYRRHIZIN | 2.5 |
| SODIUM ACID PYROPHOSPHATE | 3.5 |
| ETHYL MALTOL | 1 |
| ARTIFICIAL CANDIED SUGAR FLAVOR | 3 |

EXAMPLE 14

|  | % |
|---|---|
| DEXTRINS (MOR-REX 1918) | 82.6 |
| MAG (MAFCO-MAGNASWEET 100) | 3.5 |
| MONOSODIUM PHOSPHATE, ANHYDROUS | 7.5 |
| ETHYL MALTOL | 1.5 |
| ARTIFICIAL CANDIED SUGAR FLAVOR | 3.4 |
| ARTIFICIAL CREAM (LIQUID) | 1.5 |

95 gallons of hot water (140°–145° F.) is placed in a 250 gallon stainless steel tank fitted with a turbine mixer. Then 37.975 pounds of the MAG are added and mixed to form a clear solution. Then, in the following order, 81.375 pounds of the monosodium phosphate, anhydrous, 36.890 pounds of the ARTICICIAL CANDIED SUGAR FLAVOR, 16.275 pounds of the ARTIFICIAL CREAM, and 16.275 pounds of the ethyl maltol are added and mixed until a clear solution is obtained. Then, 896.21 pounds of the MOR-REX 1918 is added, in the manner described in Example 2 and the balance of the procedure described in Example 2 is carried out.

The foregoing composition is a bulk sweetener and flavoring composition having the general physical characteristics described in Example 2, but distinctly improved in properties, as described above, by virtue of the use of monosodium phosphate, anhydrous in place of sodium acid pyrophosphate.

EXAMPLE 15

|  | % |
|---|---|
| CERELOSE 2025 (DEXTROSE) | 88.2 |
| MAG (MAFCO-MAGNASWEET 100) | 2.5 |
| MONOSODIUM PHOSPHATE, ANHYDROUS | 5 |
| ETHYL MALTOL | 1 |
| ARTIFICIAL CANDIED SUGAR FLAVOR | 2.3 |
| ARTIFICIAL CREAM FLAVOR (LIQUID) | 1 |

The foregoing pulverulent sweetener composition is made by thoroughly mixing together 1764 pounds of the CERELOSE, 50 pounds of the MAG, 100 pounds of the monosodium phosphate, anhydrous, 20 pounds of the ethly maltol, 46 pounds of the ARTIFICIAL CANDIED SUGAR FLAVOR, and 20 pounds of the ARTIFICIAL CREAM FLAVOR. The resulting powdered or pulverulent composition is packaged in small packets for use in restaurants and homes.

What is claimed is:

1. A low caloire sweetener and flavor composition containing the following ingredients in substantially the following percentages by weight:

|  | % |
|---|---|
| Corn starch hydrolysate | 90 |
| Ammoniated glycyrrhizin | 2.5 |
| Monosodium phosphate, anhydrous | 3.5 |
| Ethyl maltol | 1 |

* * * * *